United States Patent
Xiao

(10) Patent No.: US 8,994,305 B2
(45) Date of Patent: Mar. 31, 2015

(54) FILTERING REACTOR STAGE AND VARIABLE-FREQUENCY DRIVING SYSTEM USING THE SAME

(75) Inventor: Wei-Cheng Xiao, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 511 days.

(21) Appl. No.: 13/481,863

(22) Filed: May 27, 2012

(65) Prior Publication Data

US 2013/0176754 A1   Jul. 11, 2013

(30) Foreign Application Priority Data

Jan. 11, 2012   (TW) ............................. 101101038 U

(51) Int. Cl.
 *H02P 27/00* (2006.01)
 *H02M 1/12* (2006.01)
 *H01F 17/04* (2006.01)

(52) U.S. Cl.
 CPC .............. *H02M 1/126* (2013.01); *H01F 17/04* (2013.01)
 USPC ...................................................... 318/400.3

(58) Field of Classification Search
 CPC ........... H02P 6/001; H02P 6/085; H02P 6/00; Y02T 10/7005; Y02T 10/7077; H02M 2001/0064; H02M 5/4585; H02M 5/4085
 See application file for complete search history.

(56) References Cited

U.S. PATENT DOCUMENTS

| | | | |
|---|---|---|---|
| 6,867,564 B1* | 3/2005 | Wu et al. | 318/448 |
| 7,132,812 B1 | 11/2006 | Wu et al. | |
| 2008/0246459 A1* | 10/2008 | Ingman | 323/355 |
| 2012/0106210 A1* | 5/2012 | Xu et al. | 363/37 |
| 2012/0201056 A1* | 8/2012 | Wei et al. | 363/37 |

* cited by examiner

*Primary Examiner* — Shawki S Ismail
*Assistant Examiner* — Zoheb Imtiaz
(74) *Attorney, Agent, or Firm* — CKC & Partners Co., Ltd.

(57) ABSTRACT

A filtering reactor stage and a variable-frequency driving system utilizing the same are provided. The system includes a rectifier input stage, an inverter output stage and a filter reactor stage. The filter reactor stage is coupled between the rectifier input stage and the inverter output stage. The filter reactor stage includes a magnetic core module, a first winding set, a second winding set and a third winding set. The magnetic core module includes a middle pillar and two side pillars. The first second winding sets are wound around two side pillars respectively. The first winding second winding sets are coupled to a first DC (Direct Current) bridge between the rectifier input stage and the inverter output stage. The third winding set is wound around the middle pillar and coupled to a second DC bridge between the rectifier input stage and the inverter output stage.

15 Claims, 5 Drawing Sheets

US 8,994,305 B2

FILTERING REACTOR STAGE AND VARIABLE-FREQUENCY DRIVING SYSTEM USING THE SAME

RELATED APPLICATIONS

This application claims priority to Taiwan Patent Application Serial Number 101101038, filed Jan. 11, 2012, which is herein incorporated by reference.

BACKGROUND

1. Technical Field

The present disclosure relates to a filtering reactor. More particularly, the present disclosure relates to a filtering reactor stage utilized in a variable-frequency driving system.

2. Description of Related Art

In the field of controlling an electrical machine or an induction motor, how to adjust the speed of the motor is an important topic. A conventional electrical machine usually utilizes a DC (Direct Current) speed modulator, and its applications are limited due to a large hardware size and a high failure rate.

The variable-frequency drive (VFD) is based on variable-frequency and active electronic-component technologies to control the output of an AC (Alternating Current) motor by adjusting the frequency and amplitude of an operation power source transmitted from an input terminal.

The variable-frequency drive is configured to change the frequency and amplitude of the AC power source supplied to the induction motor, and further to change a cycle of the kinetic magnetic field on the induction motor, such that a rotating speed of the induction motor can be adjusted smoothly. The emergence of the variable-frequency drive simplifies the speed control process, which used to be complex and difficult. The AC induction motor collaborating with the variable-frequency drive may be used to replace most of the jobs which only can be done by using the DC electrical machinery originally, such that the size of the circuitry system with the AC induction motor and the variable-frequency drive can be reduced and the failure rate can be lowered.

A conventional variable-frequency drive usually includes a rectifier and an inverter. A current ripple noise may occur on a signal transmission between the rectifier and the inverter. A common solution for filtering out the current ripple noise is to implement a capacitor on a DC bridge of one single side between the rectifier and the inverter. However, when the variable-frequency drive is in operation, two common-mode currents are generated to flow from the rectifier to the inverter via two DC bridges on both sides between the rectifier and the inverter. A conventional way to lower the common-mode currents is to implement capacitors on both DC bridges, thereby suppressing electromagnetic interference (EMI). However, the capacitors in the conventional solution may only provide limited effects on suppressing the common-mode currents.

SUMMARY

In order to solve the aforesaid problems, preferable embodiments of the invention provide a filtering reactor stage and a variable-frequency driving system utilizing the same. The filtering reactor stage may provide a sufficient common-mode inductance for suppressing the common-mode currents, and may form an adjustable differential-mode inductance, thereby reducing an energy loss of the filtering reactor.

A preferable embodiment of the invention is to provide a filtering reactor stage with three winding sets. Two of the winding sets are coupled on one DC bridge of a variable-frequency driving system and wound around two side pillars of a magnetic core module. The other winding set is coupled on the other DC bridge of the variable-frequency driving system and wound around a middle pillars of the magnetic core module. Under a common mode, magnetic fluxes from three winding sets are accumulated; and under a differential mode, the magnetic fluxes from the winding sets on two side pillars are offset with the magnetic flux from the winding set on the middle pillar. In this case, three winding sets may provide a sufficient common-mode inductance for suppressing the common-mode currents, and form an adjustable differential-mode inductance for reducing an energy loss of the filtering reactor.

A preferable embodiment of the invention is to provide a variable-frequency driving system coupled to a three-phase electric grid. The variable-frequency driving system includes a rectifier input stage, an inverter output stage and a filter reactor stage. The rectifier input stage is coupled to the three-phase electric grid. The filter reactor stage is coupled between the rectifier input stage and the inverter output stage. The filter reactor stage includes a magnetic core module, a first winding set, a second winding set and a third winding set. The magnetic core module includes a middle pillar, a first side pillar and a second side pillar. The first winding set is wound around the first side pillar. The second winding set is wound around the second side pillar. The first winding set and the second winding set are connected in series to a first DC bridge between the rectifier input stage and the inverter output stage. The third winding set is wound around the middle pillar. Two ends of the third winding set are connected to a second DC bridge between the rectifier input stage and the inverter output stage.

According to a preferable embodiment of the invention, the rectifier input stage is configured to transform an AC input voltage with a fixed operating frequency from the three-phase electric grid into a DC voltage. The inverter output stage is configured to transform the DC voltage into an AC output voltage with a variable frequency. The AC output voltage is configured to drive an external load.

According to a preferable embodiment of the invention, the middle pillar, the first side pillar and the second side pillar of the magnetic core module are substantially parallel to each other. The first side pillar and the second side pillar are located on two opposite sides of the middle pillar.

According to a preferable embodiment of the invention, under a differential mode, two magnetic fluxes generated by the first winding set and the second winding set are in the same direction and offset by a magnetic flux generated by the third winding set in a reverse direction.

According to a preferable embodiment of the invention, under the differential mode, differential-mode currents on the first DC bridge and the second DC bridge are in opposite directions.

According to a preferable embodiment of the invention, under a common mode, three magnetic fluxes generated by the first winding set, the second winding set and the third winding set are in the same direction.

According to a preferable embodiment of the invention, under the common mode, common-mode currents on the first DC bridge and the second DC bridge are in the same direction from the rectifier input stage to the inverter output stage.

According to a preferable embodiment of the invention, the magnetic core module is an E-I core combination or an E-E core combination.

A preferable embodiment of the invention is to provide a filter reactor stage coupled between a rectifier input stage and an inverter output stage. The filter reactor stage includes a magnetic core module, a first winding set, a in second winding set and a third winding set. The magnetic core module includes a middle pillar, a first side pillar and a second side pillar. The first winding set is wound around the first side pillar. The second winding set is wound around the second side pillar. The first winding set and the second winding set is connected in series to a first DC bridge between the rectifier input stage and the inverter output stage. The third winding set is wound around the middle pillar. Two ends of the third winding set are connected to a second DC bridge between the rectifier input stage and the inverter output stage.

According to a preferable embodiment of the invention, the middle pillar, the first side pillar and the second side pillar of the magnetic core module are substantially parallel to each other. The first side pillar and the second side pillar are located on two opposite sides of the middle pillar.

According to a preferable embodiment of the invention, under a differential mode, two magnetic fluxes generated by the first winding set and the second winding set are in the same direction and offset by a magnetic flux generated by the third winding in a reverse direction.

According to a preferable embodiment of the invention, under the differential mode, differential-mode currents on the first DC bridge and the second DC bridge are in opposite directions.

According to a preferable embodiment of the invention, under a common mode, three magnetic fluxes generated by the first winding set, the second winding set and the third winding set are in the same direction.

According to a preferable embodiment of the invention, under the common mode, common-mode currents on the first DC bridge and the second DC bridge are in the same direction from the rectifier input stage to the inverter output stage.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 1:
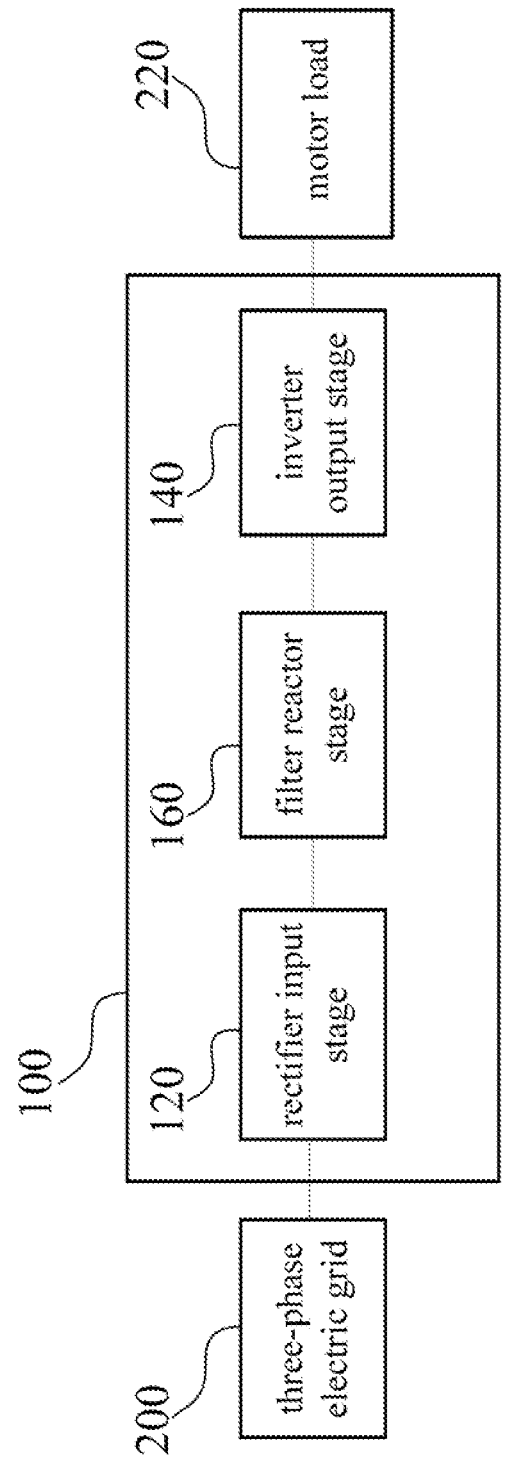
FIG. 1 is a functional block diagram illustrating a variable-frequency driving system according to a preferable embodiment of the invention.

Reference is made to FIG. 1, which is a functional block diagram illustrating a variable-frequency driving system 100 according to a preferable embodiment of the invention. As shown in FIG. 1, the variable-frequency driving system 100 includes a rectifier input stage 120, an inverter output stage 140 and a filter reactor stage 160.

In the preferable embodiment, the variable-frequency driving system 100 may receive an AC input voltage with a fixed operating frequency from the three-phase electric grid 200. The variable-frequency driving system 100 may adjust the frequency and amplitude of the AC input voltage, and provide an AC output voltage after adjustment to drive an external motor load 220 (e.g., an induction motor), so as to adjust a rotating speed of the motor load 220 smoothly.

In order to realize functions mentioned above, the rectifier input stage 120, electrically connected to the three-phase electric grid 200, is configured to transform an AC input voltage with a fixed operating frequency from the three-phase electric grid 200 into a DC voltage. The inverter output stage 140 is configured to transform the DC voltage into an AC output voltage with a variable frequency. The AC output voltage is configured to drive the motor load 220.

It is to be noted that, there is a filter reactor stage 160 coupled between the rectifier input stage 120 and the inverter output stage 140 according to the preferable embodiment. The filter reactor stage 160 can be used to filter out DC ripple noises and electromagnetic interference (EMI), so as to ensure the transmission quality of electrical signals between the rectifier input stage 120 and the inverter output stage 140. In this preferable embodiment, the filter reactor stage 160 may form a differential-mode inductance and a common-mode inductance. The differential-mode inductance can be used to block the DC ripple noises. The common-mode inductance can be used to reduce the electromagnetic interference (EMI).

Figure 2:
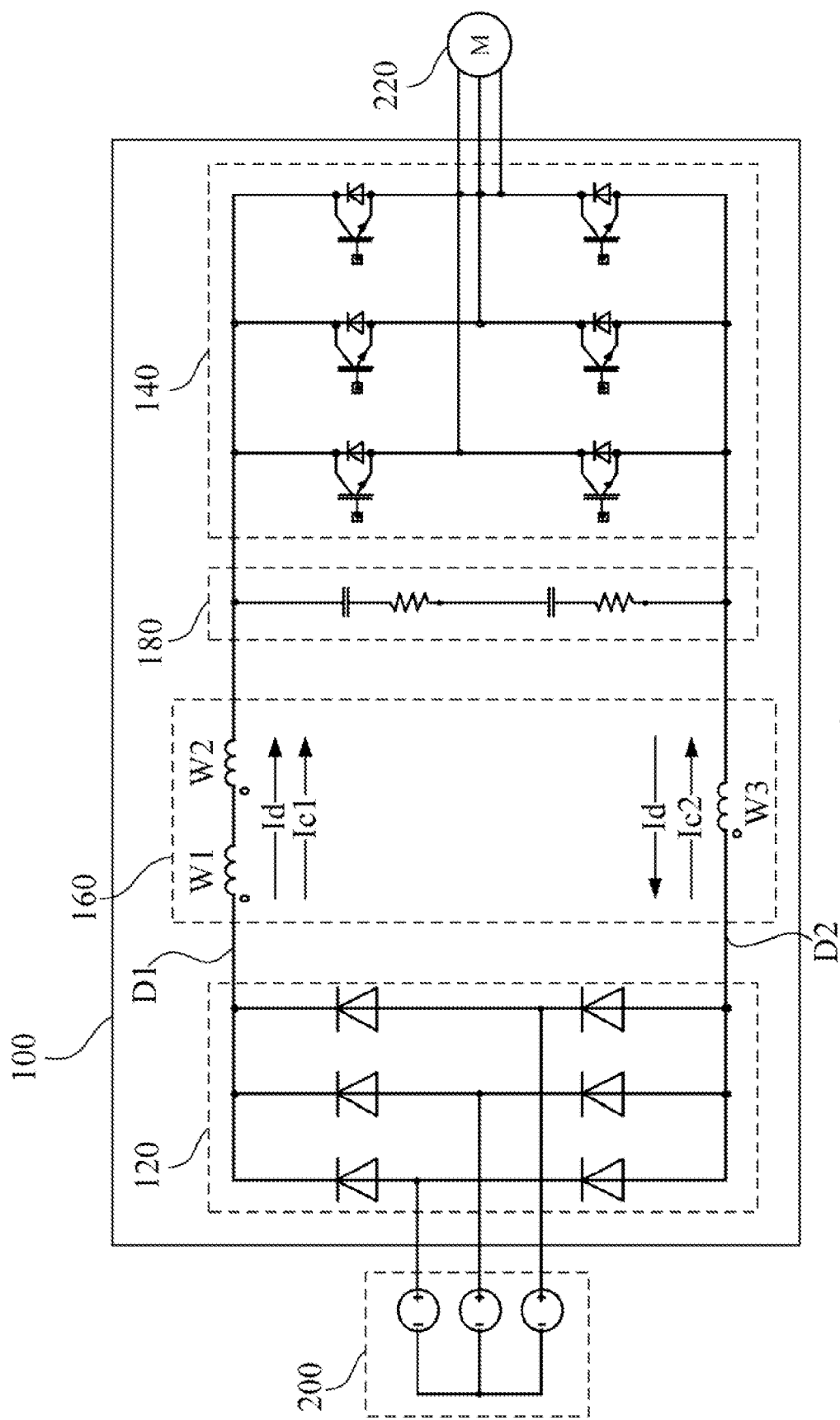
FIG. 2 is a schematic diagram illustrating a circuitry structure of the variable-frequency driving system according to a preferable embodiment of the invention.

Reference is made to FIG. 2 at the same time. FIG. 2 is a schematic diagram illustrating a circuitry structure of the variable-frequency driving system 100 according to a preferable embodiment of the invention. As shown in FIG. 2, the rectifier input stage 120 is electrically connected to the inverter output stage 140 via a first DC bridge D1 and a second DC bridge D2.

Under a differential mode, the differential-mode current Id on the first DC bridge D1 flows from the rectifier input stage 120 to the inverter output stage 140, and the differential-mode current Id on the second DC bridge D2 flows from the inverter output stage 140 to the rectifier input stage 120. The differential-mode currents Id on the first DC bridge D1 and the second DC bridge D2 are in opposite directions.

Under a common mode, one part of the common-mode current Ic1 on the first DC bridge D1 flows from the rectifier input stage 120 to the inverter output stage 140, and another part of the common-mode current Ic2 also flows from the rectifier input stage 120 to the inverter output stage 140. The common-mode currents Ic1 and Ic2 on the first DC bridge D1 and the second DC bridge D2 are in the same direction.

Figure 3:
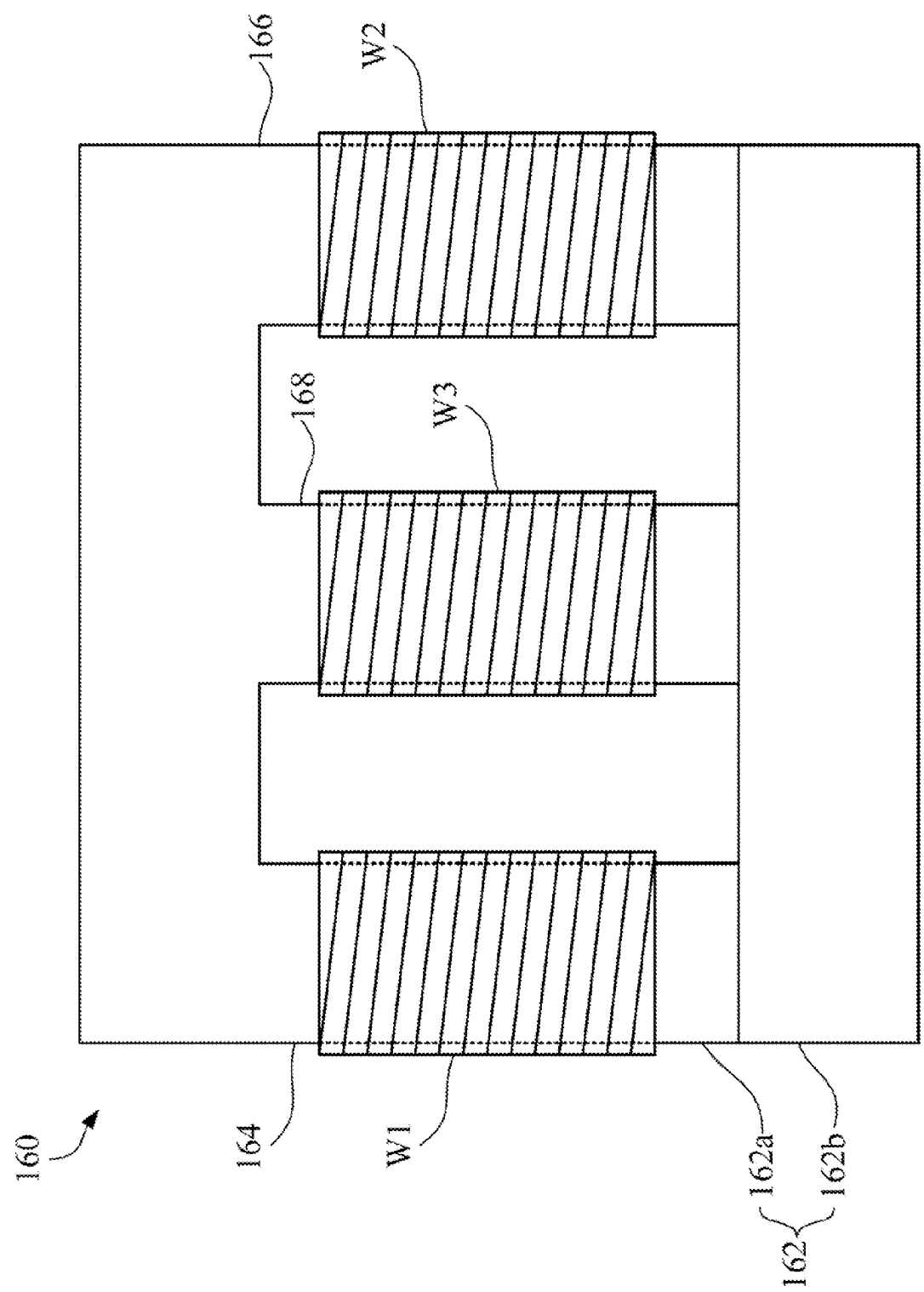
FIG. 3 is a schematic diagram illustrating a filter reactor stage according to a preferable embodiment of the invention.

Reference is made to FIG. 3 at the same time FIG. 3 is a schematic diagram illustrating the filter reactor stage 160 according to a preferable embodiment of the invention. The filter reactor stage 160 includes a magnetic core module 162, a first winding set W1, a second winding set W2 and a third winding set W3. The magnetic core module 162 includes a middle pillar 168, a first side pillar 164 and a second side pillar 166.

As shown in FIG. 3, the middle pillar 168, the first side pillar 164 and the second side pillar 166 of the magnetic core module 162 are substantially parallel to each other. The first side pillar 164 and the second side pillar 166 are located on two opposite sides of the middle pillar 168.

In this preferable embodiment, the magnetic core module 162 may includes two core components 162a and 162b. One core component 162a can be an E-shaped core component and the other core component 162b can be an I-shaped core component. In other words, the magnetic core module 162 can be an E-I core combination consisting of an E-shaped core component and an I-shaped core component. In addition, there are three gaps located among three arms of the E-shaped core component 162a and the I-shaped core component 162b for spacing two core components. In some embodiments, three gaps can be formed with an identical width, so as to simplify the formation of the gaps and the adjustment of the magnetic characteristics of the magnetic core module 162.

It is to be noted that, the magnetic core module 162 is not limited to an E-I core combination. In another preferable embodiment, the magnetic core module 162 may include an E-E core combination or any other equivalent core(s).

The first winding set W1 is wound around the first side pillar 164. Two ends of the first winding set W1 is coupled to a first DC bridge D1 between the rectifier input stage 120 and the inverter output stage 140. The second winding set W2 is wound around the second side pillar 166. Two ends of the second winding set W2 is also coupled to the first DC bridge D1. Furthermore, two ends of the second winding set W2 is coupled between the first winding set W1 and the inverter output stage 140. In other words, the first winding set W1 and the second winding set W2 are connected in series to the first DC bridge D1 between the rectifier input stage 120 and the inverter output stage 140. The third winding set W3 is wound around the middle pillar 168. Two ends of the third winding set W3 are connected to a second DC bridge D2 between the rectifier input stage 120 and the inverter output stage 140.

Self-inductances and mutual-inductances among three winding sets W1, W2 and W3 can be represented as the following matrix:

$$L_{xy} = \begin{bmatrix} L_{11} & M_{12} & M_{13} \\ M_{21} & L_{22} & M_{23} \\ M_{31} & M_{32} & L_{33} \end{bmatrix};$$

where L represents the self-inductance, M represents the mutual-inductance, and x, y represent the number of the first winding set W1, the second winding set W2 and the third winding set W3.

Figure 4:
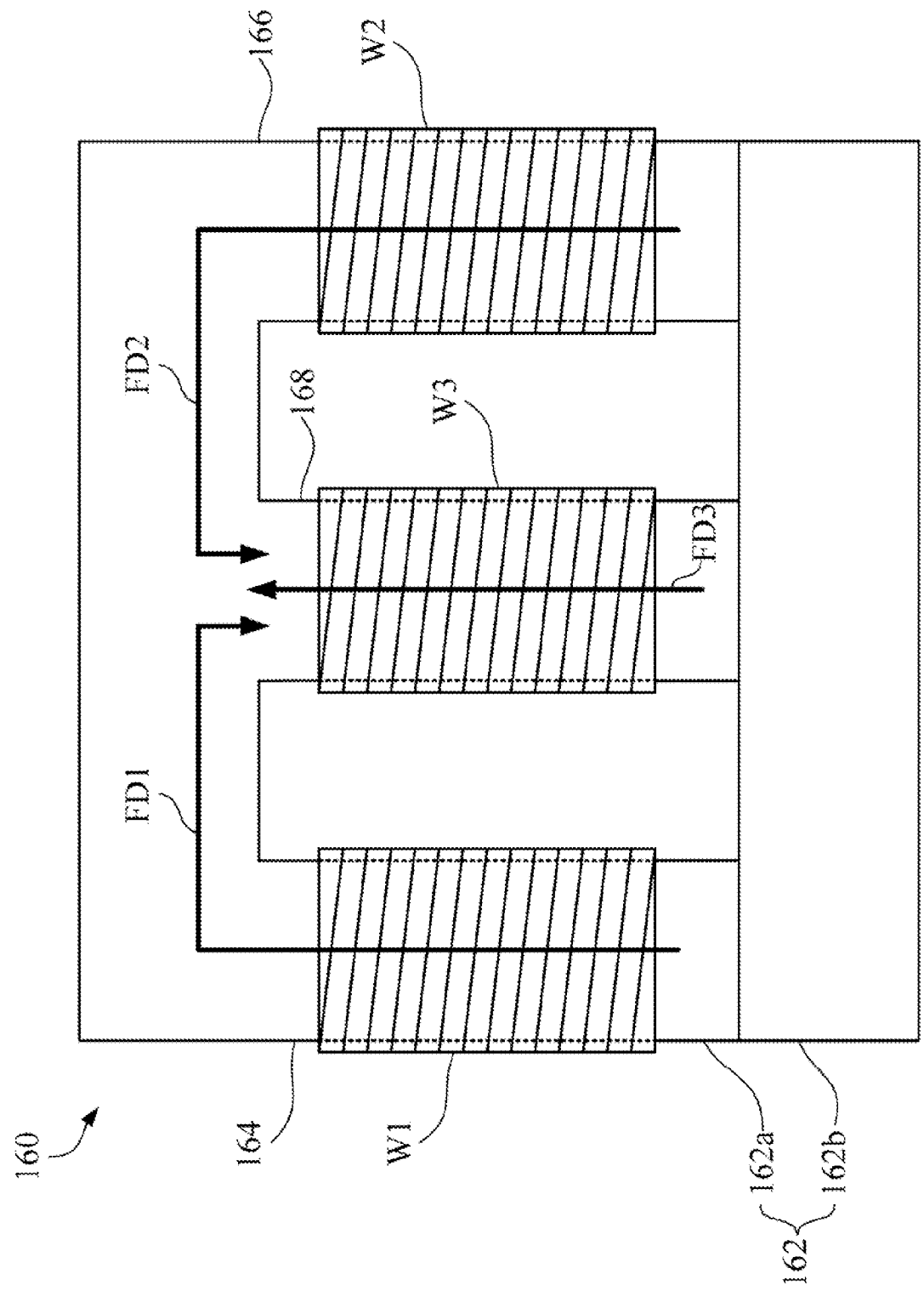
FIG. 4 is a schematic diagram illustrating the filter reactor stage shown in FIG. 3 under a differential mode.

Reference is also made to FIG. 4, which is a schematic diagram illustrating the filter reactor stage 160 in FIG. 3 under a differential mode. Under the differential mode, a magnetic flux FD1 generated by the first winding set W1 and a magnetic flux FD2 generated by the second winding set W2 are in the same direction. In addition, the magnetic flux FD1 and the magnetic flux FD2 are offset by a magnetic flux FD3 generated by the third winding set W3 in a reverse direction. Therefore, the combined result of the magnetic fluxes FD1, FD2 and FD3 (i.e., the sum of the first and second magnetic fluxes minus the third magnetic flux, FD1+FD2−FD3) is utilized to form an adjustable differential-mode inductance. The value of the differential-mode inductance can be adjusted by varying a winding density of each winding set, a number of turns of each winding set, or a proportional relationship between winding sets.

In detail, under the differential mode, two magnetic fluxes generated by two side winding sets (i.e., the first winding set W1 and the second winding set W2) is offset by the magnetic flux generated by the middle winding set (i.e., the third winding set W3) within the magnetic core module 162. A desirable differential-mode inductance and a desirable saturation current of the filter reactor stage 160 can be established by controlling the differential-mode magnetic fluxes according to the aforesaid offset relationship. Based on the inductance matrix of the winding sets, the differential-mode inductance can be represented as follow equation:

$$L_{DM} = (L_{11} + M_{12} + M_{13}) + (L_{22} + M_{21} + M_{23}) + (L_{33} + M_{31} + M_{32}); \text{ where}$$

$M_{12}\ M_{13}\ M_{21}\ M_{23}\ M_{31}\ M_{32} < 0$ under the differential mode.

Figure 5:
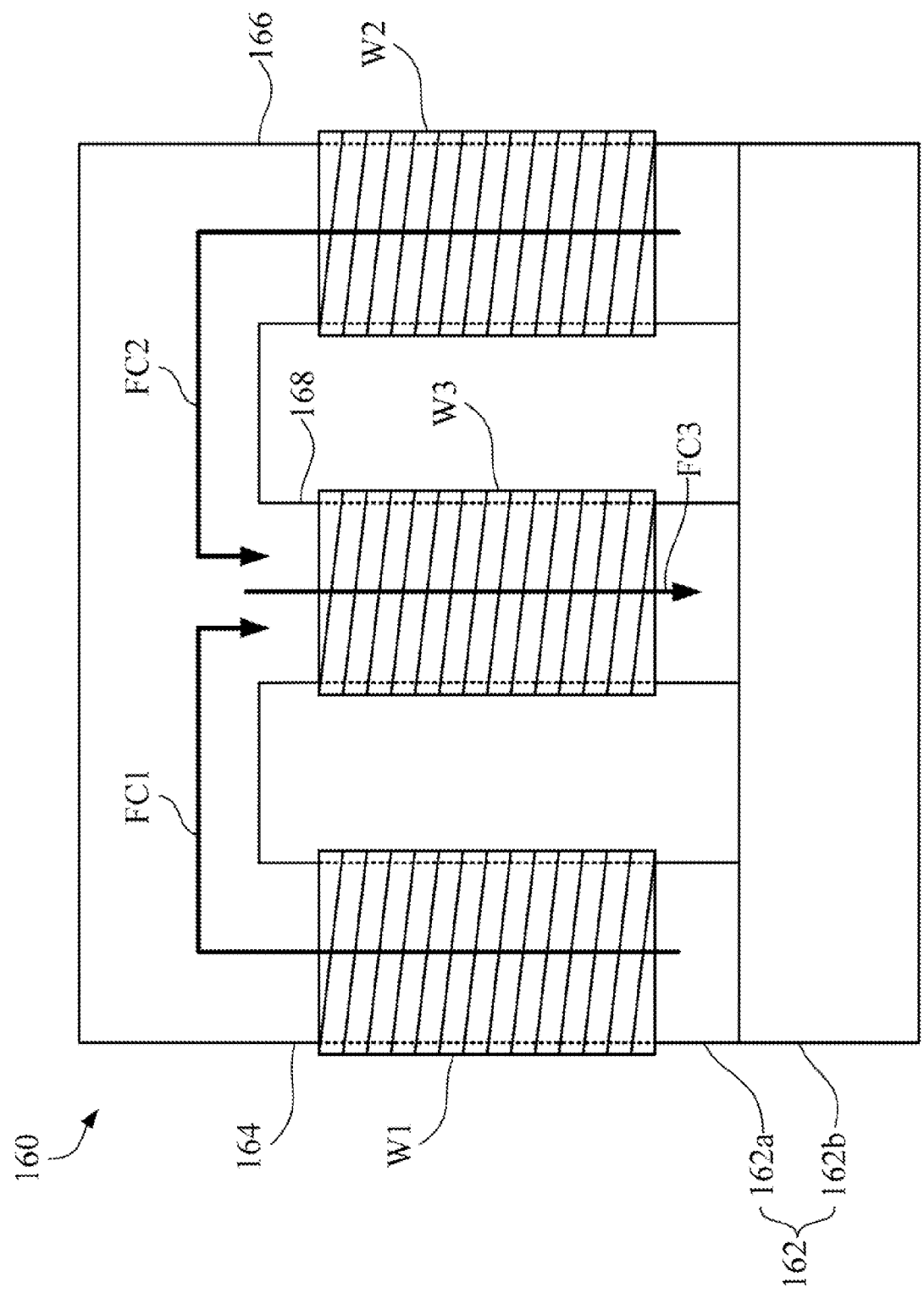
FIG. 5 is a schematic diagram illustrating the filter reactor stage shown in FIG. 3 under a common mode.

Reference is also made to FIG. 5, which is a schematic diagram illustrating the filter reactor stage 160 in FIG. 3 under a common mode. Under the common mode, three magnetic fluxes FD1, FD2 and FD3 respectively generated by the first winding set W1, the second winding set W2 and the third winding set W3 are in the same direction. Three magnetic fluxes FD1, FD2 and FD3 are accumulated to form an adjustable common-mode inductance with a high inductance value. The value of the common-mode inductance can be adjusted by varying a winding density of each winding set, a number of turns of each winding set, or a proportional relationship between winding sets (W1~W3).

Under the common mode, three magnetic fluxes are accumulated within the magnetic core module 162. Based on the inductance matrix of the winding sets, the common-mode inductance can be represents as follow:

$$L_{CM} = (L_{11} + M_{12} + M_{13}) + (L_{22} + M_{21} + M_{23}) // (L_{33} + M_{31} + M_{32}); \text{ where}$$

$M_{12}\ M_{21} < 0$ under the common mode.

In practical applications, the common-mode current is usually lower than the differential-mode current. Therefore, the current on the filter reactor stage 160 will not be over-saturated even though the magnetic fluxes are accumulated together under the common mode.

In addition, the variable-frequency driving system 100 shown in FIG. 2 according to the preferable embodiment further includes an energy storage module 180. In practical applications, the energy storage module 180 may include a capacitor (as shown in FIG. 2). Two ends of the energy storage module 180 are coupled to two DC bridges (i.e., the first DC bridge D1 and the second DC bridge D2). Furthermore, the energy storage module 180 is disposed between the filter reactor stage 160 and the inverter output stage 140. The energy storage module 180 is configured to temporarily store the DC voltage generated by the rectifier input stage 120 and to drive the inverter output stage 140 accordingly.

As mention in the aforesaid embodiments, a preferable embodiment of the invention is to provide a filtering reactor stage with three winding sets. Two of the winding sets are coupled to one DC bridge of a variable-frequency driving system and wound around two side pillars of a magnetic core module. The other winding set is coupled to the other DC bridge of the variable-frequency driving system and wound around a middle pillar of the magnetic core module. Under a common mode, magnetic fluxes from three winding sets are accumulated; and under a differential mode, the magnetic fluxes from the winding sets on two side pillars are offset by the magnetic flux from the winding set on the middle pillar. In this case, three winding sets may provide a sufficient common-mode inductance for suppressing the common-mode currents, and form an adjustable differential-mode inductance for reducing an energy loss of the filtering reactor.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A variable-frequency driving system coupled to a three-phase electric grid, the variable-frequency driving system comprising:
   a rectifier input stage coupled to the three-phase electric grid;
   an inverter output stage; and
   a filter reactor stage coupled between the rectifier input stage and the inverter output stage, the filter reactor stage comprising:
      a magnetic core module comprising a middle pillar, a first side pillar and a second side pillar;
      a first winding set wound around the first side pillar;
      a second winding set wound around the second side pillar, the first winding set and the second winding set being connected in series to a first DC (Direct Current) bridge between the rectifier input stage and the inverter output stage; and
      a third winding set wound around the middle pillar, two ends of the third winding set being connected to a second DC bridge between the rectifier input stage and the inverter output stage.

2. The variable-frequency driving system as claimed in claim 1, wherein the rectifier input stage is configured to transform an AC (Alternating Current) input voltage with a fixed operating frequency from the three-phase electric grid into a DC voltage, and the inverter output stage is configured to transform the DC voltage into an AC output voltage with a variable frequency, and the AC output voltage is configured to drive an external load.

3. The variable-frequency driving system as claimed in claim 1, wherein the middle pillar, the first side pillar and the second side pillar of the magnetic core module are substantially parallel to each other, and the first side pillar and the second side pillar are located on two opposite sides of the middle pillar.

4. The variable-frequency driving system as claimed in claim 1, wherein, under a differential mode, two magnetic fluxes respectively generated by the first winding set and the second winding set are in the same direction and offset by a magnetic flux generated by the third winding set in a reverse direction.

5. The variable-frequency driving system as claimed in claim 4, wherein, under the differential mode, differential-mode currents on the first DC bridge and the second DC bridge are in opposite directions.

6. The variable-frequency driving system as claimed in claim 1, wherein, under a common mode, three magnetic fluxes respectively generated by the first winding set, the second winding set and the third winding set are in the same direction.

7. The variable-frequency driving system as claimed in claim 6, wherein, under the common mode, common-mode currents on the first DC bridge and the second DC bridge are in the same direction from the rectifier input stage to the inverter output stage.

8. The variable-frequency driving system as claimed in claim 1, wherein the magnetic core module is an E-I core combination or an E-E core combination.

9. A filter reactor stage coupled between a rectifier input stage and an inverter output stage, the filter reactor stage comprising:
   a magnetic core module comprising a middle pillar, a first side pillar and a second side pillar;
   a first winding set wound around the first side pillar;
   a second winding set wound around the second side pillar, the first winding set and the second winding set being connected in series to a first DC bridge between the rectifier input stage and the inverter output stage; and
   a third winding set wound around the middle pillar, two ends of the third winding set being connected to a second DC bridge between the rectifier input stage and the inverter output stage.

10. The filter reactor stage as claimed in claim 9, wherein the middle pillar, the first side pillar and the second side pillar of the magnetic core module are substantially parallel to each other, and the first side pillar and the second side pillar are located on two opposite sides of the middle pillar.

11. The filter reactor stage as claimed in claim 9, wherein, under a differential mode, two magnetic fluxes respectively generated by the first winding set and the second winding set are in the same direction and offset by a magnetic flux generated by the third winding set in a reverse direction.

12. The filter reactor stage as claimed in claim 11, wherein, under the differential mode, differential-mode currents on the first DC bridge and the second DC bridge are in opposite directions.

13. The filter reactor stage as claimed in claim 9, wherein, under a common mode, three magnetic fluxes generated by the first winding set, the second winding set and the third winding set are in the same direction.

14. The filter reactor stage as claimed in claim 13, wherein, under the common mode, common-mode currents on the first DC bridge and the second DC bridge are in the same direction from the rectifier input stage to the inverter output stage.

15. The filter reactor stage as claimed in claim 13, wherein the magnetic core module is an E-I core combination or an E-E core combination.

* * * * *